3,469,971
RECOVERY OF PLATINUM FROM
DEACTIVATED CATALYSTS
James G. Leopard, Shreveport, La., assignor to Universal Oil Products Company, Des Plaines, Ill., a corporation of Delaware
No Drawing. Filed Feb. 28, 1967, Ser. No. 619,203
Int. Cl. C22b 11/00
U.S. Cl. 75—121                                5 Claims

ABSTRACT OF THE DISCLOSURE

The removal of iron contaminants from platinum recovered from deactivated platinum-alumina catalysts by treating the platinum residue with activated carbon in an oxygen-free atmophere and then in an oxygen-containing atmosphere. The resulting mixture is then treated with a mineral acid whereby the iron contaminant is solubilized and is thereafter removed from the platinum group metal.

BACKGROUND OF THE INVENTION

The present invention relates to recovery of platinum group metal components of a carbonized, deactivated catalytic composite comprising the same in combination with one or more refractory inorganic oxides. A variety of commercially important hydrocarbon conversion reactions including cyclization, dehydrocyclization, isomerization, aromatization, hydrogenation, dehydrogenation, etc., are effectively catalyzed under varied conditions by catalytic composites comprising a platinum group metal component composited with a refractory inorganic oxide carried material. The catalytic composites will in each instance gradually become deactivated and regeneration is required if the catalyst is to perform its intended function in an economical manner. Deactivation may result from a number of conditions which may be peculiar to the particular hydrocarbon conversion process involved. Most usually, deactivation results from an excessive deposition of carbonaceous matter and also certain metallic impurities or contaminates such as lead, antimony, arsenic, iron, copper, etc., and various compounds thereof which may occur in the hydrocarbon feed stock. In any case, the carbonaceous deposites, usually in combination with one or more of the described metal contaminants obstructs the hydrocarbon being processed from access to the active catalytic centers of the catalyst composite.

The carbonaceous material is readily removed by air oxidation of the deactivated catalyst and, to all appearances, an active catalyst is recovered. Other more recent methods, used in conjunction with air oxidation, restore the catalytic components to their initial activity. However, each regeneration produces a catalyst somewhat less stable than its predecessor and regeneration is required with increasing frequency. Eventually, regeneration is no longer economically feasible and a fresh catalyst charge is necessitated. The excessively high cost of the platinum group metal component precludes a disposition of the deactivated catalyst composite without a recovery of essentially all of said component therefrom. This is so although the platinum group metal component may be as little as only 0.1–1.0 weight percent of the catalyst composite. Although the method of this invention is further described with reference to platinum-containing catalyst composite. Although the method of this invention is further described with reference to platinum-containing catalysts, it is also employed advantageously in the recovery of other platinum group metals, i.e., palladium, iridium, osmium, rhodium, ruthenium, and particularly palladium. The described metals are generally composited with alumina, silica, zirconia, thoria, boria, or other refractory inorganic oxide including combinations thereof such as slica-alumina, silica-zirconia, alumina-zirconia, and the like.

It is the general practice to recover the platinum group metal, for example platinum, from a deactivated catalyst, for example platinum-alumina, by initially treating said catalyst with a strong mineral acid such as sulfuric acid, hydrochloric acid, nitric acid and the like, or a strong base such as an alkali metal hydroxide solution, particularly a strong sodium hydroxide solution, capable of reacting with the alumina and forming a soluble compound thereof. With catalysts other than platinum-alumina, the acid or base employed is dependent on the refractory inorganic oxide involved. Thus, where the refractory inorganic oxide is beryllium oxide, a concentrated sulfuric acid is suitably employed, and when the refractory inorganic oxide is vanadium oxide, nitric acid is suitable. The acid or base should be employed in sufficient concentration to effect the desired reaction. Sulfuric acid in from about 25% to about 90% concentration is suitable with 35–70% being preferred. Nitric acid in about 37% concentration is satisfactory.

Sulfuric acid is generaly preferred since the desired reaction is facilitated by heat and sulfuric acid has a boiling point permitting the use of higher temperatures. The reaction is usually effected at reflux conditions with the bottom temperature being generally in the 100°–130° C. range. In most cases, the refractory inorganic oxide will be suitably digested within a period of 1 or 2 hours.

The resulting mixture consists of an insoluble platinum-containing residue and a solution of a water soluble salt, the cation of which is derived from the refractory inorganic oxide. For example, when a deactivated platinum-alumina catalyst is reacted with sulfuric acid, the alumina is converted to aluminum sulfate which is readily soluble. The aluminum sulfate solution is separated from the platinum-containing residue by filtration, decantation, or other suitable means.

The platinum-containing residue may or may not contain carbonaceous matter depending on whether or not the carbonaceous matter was burned from the deactivated catalyst prior to treating the same with a strong acid or base as aforesaid. In any case, the residue is dried at about 100–130° C. and, should carbonaceous matter be present, subjected to air oxidation at a temperature of from about 400° C. to about 700°° C. or more.

The previously mentioned metal impurities or contaminants are for the most part separated from the platinum containing residue during the acid treatment. Frequently, iron compounds, such as iron oxide, are converted by over heating, either in the refinery, catalyst regeneration, or during the platinum recovery process, to a particularly insoluble form difficult to remove merely by treatment with the sulfuric or other strong mineral acid. Thus, the platinum-containing residue frequently contains as an insoluble iron form in addition to platinum which interferes with the efficient, economical recovery of the platinum or platinum group metal from the deactivated catalyst.

It is an object of this invention to provide a method for the recovery of a platinum group metal component from a deactivated catalyst composite comprising said component and a refractory inorganic oxide whereby substantially acid insoluble iron contaminants are separated therefrom.

SUMMARY OF THE INVENTION

In one of its broad aspects, this invention relates to the recovery of a platinum group metal from a deactivated catalyst composite comprising said metal and a refractory inorganic oxide whereby said composite is dissolved in a strong mineral acid leaving a residue comprising said platinum group metal and an insoluble iron contaminant, and embodies the improvement which comprises commingling said residue with carbon and heating the mixture in an oxygen-free atmosphere at a temperature of from about 750° C. to about 800° C., then heating said mixture in contact with a gas containing free oxygen at a temperature of from about 625° C. to about 675° C., thereafter reacting the resulting mixture with a strong mineral acid and recovering a substantially iron-free platinum group metal from the reaction mixture.

Other objects and embodiments of this invention will become apparent in the following detailed specification.

Pursuant to the method of this invention, the platinum-containing residue is commingled with carbon and heated in an oxygen-free atmosphere. The carbon utilized in accordance with the present method is a relatively pure carbon compared to the carbonaceous material which contributed to the catalyst deactivation. The carbon herein contemplated includes the various charcoals produced by the destructive distillation of wood, peat, lignite, nut shells, bones, and other such carbonaceous matter, and preferably such charcoals as have been heat treated, or chemically treated, or both, to form a highly porous material generally described as activated carbon. The quantity of carbon required is dependent on the extent of iron contamination and any amount in excess of one equivalent of carbon per equivalent of iron is suitable. Preferably, the carbon is utilized in only a slight excess. In any event, the mixture is heated in an oxygen-free atmosphere at a temperature of from about 750° C. to about 800° C. adequate heating is accomplished in from about 0.5 to about 10 hours dependent upon the degree of iron contamination and the volume of material being treated.

In the further practice of this invention, the aforesaid treatment in an oxygen-free atmosphere is followed by a treatment in a molecular oxygen-containing atmosphere at a temperature of from about 625° C. to about 675° C. This last mentioned treatment is suitably accomplished in from about 0.5 to about 5 hours, a period of from about 0.5 to about 1.5 hours usually being adequate. By the foregoing procedure, the iron contaminant is rendered soluble in a strong mineral acid and is readily separable from the platinum-containing residue. Thus, the mixture resulting from the aforementioned treatment is reacted with a strong mineral acid and a substantially iron-free platinum-containing residue recovered from the reaction mixture. In this instance, the mineral acid, preferably a concentrated sulfuric acid, is suitably reacted with said mixture at reflux conditions. The iron-free platinum-containing residue is separated from the reaction mixture by filtration or other suitable means and further treated in accordance with the prior art practice. For example, the platinum-containing residue is reacted with aqua regia wherein the hydrochloric acid and nitric acids are added together in a volumetric ratio of about 3/1, in an amount of at least about 1 gallon of total acid per pound of platinum contained in the residue. The aqua regia digestion is effected at a temperature of from about 75° C. to about 85° C. for a period of from 1 to 4 hours. The mixture resulting from the aqua regia digestion is filtered to remove any insoluble impurities, the filtrate being recovered and boiled down to remove the solvent and to concentrate the resulting chloroplatinic acid. It is generally preferred to recover the platinum as chloroplatinic acid for ease in handling and storage. Also, chloroplatinic acid is a suitable source of platinum and affords a convenient method for utilizing the platinum in the manufacture of fresh catalysts.

The following example is presented in illustration of one preferred embodiment of this invention and is not intended to serve as an undue limitation on the generally broad scope of the invention as set out in the appended claims.

A commercially deactivated platinum-alumina catalyst composite containing about 12.5 weight percent carbon is admixed with a concentrated sulfuric acid solution and heated at reflux temperature for about 1.5 hours. The residue comprising platinum, carbonaceous matter and insoluble iron contaminates is recovered by filtration and air oxidized at about 550° C. to burn off the carbonaceous matter. When the removal of carbonaceous matter is complete, for example, to a level of about 0.5 weight percent, the residue is admixed with activated carbon and heated in a nitrogen atmosphere at 775° C. for about 3 hours. Thereafter, the residue is air oxidized at about 650° C. for 1 hour. The residue is then further treated with concentrated sulfuric acid at reflux temperature for about 1 hour. The residue is recovered by filtration of this mixture and digested in aqua regia at about 80° C. This mixture is further filtered and the filtrate boiled down to concentrate the resulting chloroplatinic acid. Upon analysis, the chloroplatinic acid is found to be substantially free of iron, containing less than about .01 weight percent thereof.

I claim as my invention:

1. In the recovery of a platinum group metal from a deactivated catalyst composite comprising said metal and a refractory inorganic oxide whereby said composite is dissolved in a strong mineral acid leaving a residue comprising said platinum group metal and an insoluble iron contaminant, the improvement which comprises commingling said residue with carbon and heating the mixture in an oxygen-free atmosphere at a temperature of from about 750° C. to about 800° C., then heating said mixture in contact with a gas containing free oxygen at a temperature of from about 625° C. to about 675° C., thereafter reacting the resulting mixture with a strong mineral acid and recovering a substantially iron-free platinum group metal from the reaction mixture.

2. The method of claim 1 further characterized in that said refractory inorganic oxide is alumina.

3. The method of claim 2 further characterized in that said mineral acid is a concentrated sulfuric acid.

4. The method of claim 3 further characterized in that said platinum group metal is platinum.

5. The method of claim 3 further characterized in that said platinum group metal is palladium.

References Cited

UNITED STATES PATENTS

| | | | |
|---|---|---|---|
| 2,369,956 | 2/1945 | Feisst et al. | 252—413 |
| 2,641,582 | 6/1953 | Haensel | 252—416 |
| 2,704,281 | 3/1955 | Appell | 252—413 |
| 2,740,762 | 4/1956 | Earley | 252—413 |
| 3,134,732 | 5/1964 | Kearby et al. | 252—413 X |
| 3,206,413 | 9/1965 | Leopard | 252—411 |
| 3,357,915 | 12/1967 | Young | 252—411 X |

HERBERT T. CARTER, Primary Examiner

U.S. Cl. X.R.

23—139; 252—411, 413, 416